UNITED STATES PATENT OFFICE.

HENRY HOWARD, OF BOSTON, MASSACHUSETTS.

FORMIC ACID.

975,866. Specification of Letters Patent. Patented Nov. 15, 1910.

No Drawing. Application filed March 24, 1908, Serial No. 423,006. Renewed September 30, 1910. Serial No. 584,760.

*To all whom it may concern:*

Be it known that I, HENRY HOWARD, a citizen of the United States, residing at Boston, in the county of Suffolk and State of Massachusetts, have invented certain new and useful Improvements in Methods of Producing Formic Acid, of which the following is a specification.

The object of this invention is to provide an efficient method of producing formic acid from formates. It has been proposed heretofore to dissolve sodium formate in highly concentrated formic acid, and to decompose the formate by adding to the solution sulfuric acid or an acid sulfate. It has likewise been proposed to mix a dry formate with an acid sulfate, and to distil formic acid from the mixture. I have now discovered that formic acid may be readily produced, with high efficiency and without the necessity of operating in presence of previously prepared formic acid, by reacting on a formate, usually sodium formate, in presence of water, with a gaseous reagent capable of liberating formic acid, preferably with sulfur trioxid in presence of sufficient water to convert the sulfur trioxid into sulfuric acid.

I may proceed substantially as follows: Gaseous sulfur trioxid is conducted into a vessel containing sodium formate or other suitable salt of formic acid, in presence of sufficient water to combine with the sulfur trioxid with formation of sulfuric acid, the water being destributed with substantial uniformity throughout the mass of formate. The moist formate is preferably stirred throughout the operation, and is gradually and uniformly decomposed by the sulfuric acid generated by the combination of sulfur trioxid with the water. The temperature of reaction should be carefully controlled to avoid destruction of the formic acid and for this purpose the kettle or reaction vessel is preferably water-jacketed to prevent over-heating. Moreover the rate of reaction may be accurately controlled by the rate of admission of sulfur trioxid to the vessel. The formic acid produced will be highly concentrated in case the water present is sufficient only to combine with the sulfur trioxid used, although obviously acid of any desired dilution may be prepared by using a corresponding excess of water. The formic acid is recovered by distillation or otherwise as may be desired.

A particular advantage of the method above described lies in the fact that there is little or no liability to a loss of product due to local over-heating. When concentrated sulfuric acid is added to sodium formate it is necessarily present at first in local excess, and acts injuriously upon the formate or formic acid produced therefrom. If however the formate, preliminarily moistened, be exposed to gaseous sulfur trioxid the production of sulfuric acid occurs uniformly throughout the mass and there is at no time such local excess as is capable of exerting any injurious effect.

While I prefer to use sulfur trioxid as the gaseous reagent for decomposing the moist formate, I may employ other gaseous reagents which are capable of liberating formic acid, as for instance gaseous hydrochloric acid. In this case about ten per cent. of water may be employed. Whether sulfur trioxid or hydrochloric acid be used to decompose the moist formate the yield will be found to be practically theoretical if the temperature be carefully controlled. The preferred temperature of the reaction lies between 15° C. and 35° C., the reaction being more sluggish at temperatures below 15° C., and there being liability of decomposing the formic acid at temperatures greatly exceeding 35° C.

I claim:

1. In a process of producing formic acid, the method which consists in reacting upon a formate in presence of water with a gaseous reagent capable of displacing the formic acid by combining with the base of the formate, thereby liberating formic acid.

2. In a process of producing formic acid, the method which consists in bringing gaseous sulfur trioxid into reacting relation with a formate in presence of sufficient water to convert the sulfur trioxid into sulfuric acid.

3. In a process of producing formic acid, the method which consists in bringing gaseous sulfur trioxid into reacting relation with a formate in presence of sufficient water to convert the sulfur trioxid into sulfuric acid while controlling the temperature of the reaction.

4. In a process of producing formic acid, the method which consists in bringing gaseous sulfur trioxid into reacting relation with a formate in presence of water in approximately the proportion required to convert the sulfur trioxid into sulfuric acid.

5. In a process of producing formic acid, the method which consists in bringing gaseous sulfur trioxid into reacting relation with a formate in presence of water in approximately the proportion required to convert the sulfur trioxid into sulfuric acid while controlling the temperature of the reaction.

In testimony whereof, I affix my signature in presence of two witnesses.

HENRY HOWARD.

Witnesses:
ROBERT J. KING,
O. BEZANSON.